Patented May 27, 1930

1,759,919

UNITED STATES PATENT OFFICE

FELIX SINGER, OF BERLIN-CHARLOTTENBURG, GERMANY

ARTIFICIAL PLAGIOCLASE COMPOUND

No Drawing. Application filed December 9, 1927, Serial No. 239,010, and in Germany December 17, 1926.

This invention has reference to a method of obtaining synthetic feldspars, particularly feldspars of the plagioclase-series (albite, anorthite and isomorphous mixtures), and it is intended to devise means of obtaining a product of crystalline nature and particularly well adapted for various ceramic and other industrial purposes. It has been suggested heretofore to synthetically produce some of the forms of plagioclase of nature by fusion of the crude mineral constituents of these binary compounds, such as for instance by fusing stoechiometric proportions of carbonate of barium with alumina-silicates, as expressed by the symbol $BaO:Al_2O_3:2SiO_2$, but the crystals which separated out from the magma obtained could not be utilized for manufacturing and industrial purposes.

Now, this invention was as one of its main objects, conceived to overcome these difficulties and to produce compounds or compositions of high commercial and industrial value and adaptability by heating compounds of the bivalent metals with alumina and silicic acid to the reaction temperature with the precaution that the heat is kept below the temperature of fusion. Of compounds of the bivalent metals there may for instance be used for the purposes of this invention the oxides, carbonates, sulphates, silicates, aluminates and similar oxycompounds of magnesium, calcium, strontium, barium, zinc and of the bivalent iron. The alumina is preferably introduced into the mixture in the shape of its oxide, or of the hydroxide, the silicate, or as aluminates, or double silicates or the like. The silicic acid on the other hand is preferably employed in the shape of quartz-sand, or as silicates of the alkaline earths, as silicate of alumina, or as double silicate or equivalent compounds.

The ingredients may be employed in such proportions that the mixture will substantially correspond to the formula $$RO.Al_2O_3.2SiO_2$$

—e. g. the masses consisting substantially in the following compounds may be obtained:

$CaO.Al_2O_3.2SiO_2$
$MgO.Al_2O_3.2SiO_2$
$SrO.Al_2O_3.2SiO_2$
$BaO.Al_2O_3.2SiO_2$
$FeO.Al_2O_3.2SiO_2$
$ZnO.Al_2O_3.2SiO_2$

There may, of course, be deviations from these mixing proportions, if it is desired to obtain glasses and/or crystals of other compounds in the magma besides crystals of plagioclase. The temperature of reaction will vary in accordance with the nature of the raw materials and of the bivalent element employed. Generally speaking, temperatures from 1150° C. up to 1410° C. may be used and temperatures from 1280° C. to 1410° C. are preferred. This latter range of temperatures corresponds to the use of Seger cone 9 up to Seger cone 14. But the temperature should be at least 50 degrees centigrade below the fusion temperature, as indicated by the softening of the Seger-cone, the softening temperature indicating the particular point of fusion.

*Example.*—For the synthetic formation of magnesium-plagioclase the proportion will be:

MgO 10 to 20%
$Al_2O_3$ 33 to 43%
$SiO_2$ 40 to 50%

The reaction in this case commences at a temperature slightly above 1000 degrees centigrade. In this case the oxide of magnesia may be replaced by equivalent amounts of calcium - oxide, strontium - oxide, barium-oxide, oxide of zinc and ferrous oxide. All these oxides may be substituted by equivalent quantities of the corresponding carbonates or of the other compounds above enumerated; and I may also utilize mixtures of the several oxides, as for instance by making use of the particularly low-priced dolomite.

The masses obtained exhibit high resisting qualities against the action of acids and alkalis, and they even resist the action of hydrofluoric acid longer than other silicates, which is a rather surprising result, inasmuch as it could not be expected that substances of such high resistibility could be obtained, since fusing of the mass has been avoided. The masses thus obtained may be utilized as material for the manufacture of vessels and containers and pieces of apparatus, such as muffles, or as material for the construction of diaphragms, filters and other apparatus and the like. It may also serve as material for insulators, as a raw material for artificial stones, grinding preparations and the like. But the invention is not limited to these particular modes of applications or to the proportions and nature of materials, hereinbefore stated by way of exemplification of its principles, but may be modified to better adapt it to existing conditions, except as otherwise appears from the appended claims.

I claim:—

1. A process of manufacturing artificial plagioclase-compounds which consists in heating oxycompounds of bivalent metals and oxycompounds of silicon and of alumina in a proportion substantially corresponding to the formula $RO.Al_2O_3.2SiO_2$ to temperatures approximating but not reaching the point of fusion of the mixtures obtained.

2. A process of manufacturing artificial plagioclase-compounds which consists in heating mixtures of oxycompounds of bivalent metals and of oxycompounds of silicon and of alumina in a proportion substantially corresponding to the formula
$$RO.Al_2O_3.2SiO_2$$
to temperatures ranging at least fifty degrees centigrade below the points of fusion of such mixtures.

3. A process of manufacturing artificial synthetic plagioclase-compounds, which consists in heating a mixture of magnesium oxycompounds and silicic acid and alumina in a proportion substantially corresponding to the formula $MgO.Al_2O_3.2SiO_2$ to a temperature substantially above one thousand degrees centigrade, but at least fifty degrees centigrade below the fusion point of said mixture.

In testimony whereof I have affixed my signature.

Dr. FELIX SINGER.